United States Patent
Fielding

(10) Patent No.: US 6,916,207 B2
(45) Date of Patent: Jul. 12, 2005

(54) ADAPTOR TO ALLOW APPARATUS WITH NON-SCART CONNECTORS TO CONNECTORS TO CONNECT TO APPARATUS WITH SCART CONNECTORS

(75) Inventor: Victor Fielding, Barnsley (GB)

(73) Assignee: Pace Micro Technology, PLC, Shipley (GB)

( * ) Notice: Subject to any disclaimer, the term of this patent is extended or adjusted under 35 U.S.C. 154(b) by 98 days.

(21) Appl. No.: 09/896,240

(22) Filed: Jun. 29, 2001

(65) Prior Publication Data

US 2002/0013073 A1 Jan. 31, 2002

(30) Foreign Application Priority Data

Jul. 28, 2000 (GB) .............................................. 0018426

(51) Int. Cl.[7] .......................................... H01R 25/00
(52) U.S. Cl. ...................................................... 439/638
(58) Field of Search ................................. 439/638, 639, 439/502, 653

(56) References Cited

U.S. PATENT DOCUMENTS

| | | | | |
|---|---|---|---|---|
| 5,491,805 A | * | 2/1996 | Welmer ....................... 710/104 |
| 5,507,668 A | * | 4/1996 | Lambrinos et al. .......... 439/502 |
| 6,470,139 B2 | * | 10/2002 | Austin .......................... 386/95 |
| 6,503,104 B1 | * | 1/2003 | Yuga et al. .................. 439/623 |
| 6,530,085 B1 | * | 3/2003 | Perlman ........................ 725/82 |

FOREIGN PATENT DOCUMENTS

| | | |
|---|---|---|
| EP | 0 789426 A1 | 8/1997 |
| EP | 0 854550 A2 | 7/1998 |
| FR | 2553235 A3 | 10/1983 |

* cited by examiner

Primary Examiner—Hae Moon Hyeon
(74) Attorney, Agent, or Firm—Head Johnson & Kachigian

(57) ABSTRACT

The invention relates to the provision of electrical apparatus which has at least one printed circuit board on which electrical components are set out and a first format of connection type exposed to allow connection of further apparatus. The connections can be attached directly to further apparatus with the same connector format and allow transfer of data between further electrical apparatus or alternatively, at the time of manufacturing an adaptor can be provided which has connectors of the same format as those on the printed circuit board for connection with the said printed circuit board and a series of output connectors of a different format which can be exposed for the selective connection thereto of phono or other format connectors. This therefore allows a common printed circuit board design to be used for electrical apparatus for sale in any market, regardless of the particular type of connectors which are used to connect the printed circuit board to other pieces of apparatus in that market and a decision to be made by the manufacturer at the time of manufacture as to whether or not to connect the adaptor dependent on the ultimate destination of the apparatus.

10 Claims, 3 Drawing Sheets

ADAPTOR TO ALLOW APPARATUS WITH NON-SCART CONNECTORS TO CONNECTORS TO CONNECT TO APPARATUS WITH SCART CONNECTORS

CROSS-REFERENCE TO RELATED APPLICATION

This application claims priority to British Patent Application No. 0018426.7 filed 28 Jul. 2000.

BACKGROUND OF THE INVENTION

The invention to which this application relates is a conversion means which allows connection between apparatus with different connector formats and in particular apparatus provided with what is known as a "phono" format connection and apparatus which is provided with a connector format which is known as a "scart" connector.

At the present time, it can be the case that although two items of apparatus could, in theory, be connected to perform a desired function, in combination, the same cannot be connected in practise because one item of apparatus requires the use of a connection means in a first format such as a phono connector and the second item of apparatus is provided with a connection means in a different format such as a "scart" connector and the two connector types and formats are incompatible. This therefore means that the apparatus cannot then be used together which can be frustrating for the owner of the apparatus, and especially if the owner or user has no particular knowledge of different connector types.

Scart connectors are a 21-way connector used to connect video equipment together. They comprise a male and a female parts, provided in respective parts of apparatus and a data cable for connection therewith. They are typically used in Europe and other countries to provide connections for apparatus utilizing video input and output, audio input and output, RGB video and control signals. Such apparatus can include TV, VCR, satellite receiver, video cameras and home cinema apparatus. There are 20 pins in the male part, the $21^{st}$ pin connection is the metal shell of the connector, to which the screening braid of the data cable connected thereto is connected.

A phono format connector is a 2 pole connector used for audio applications typically in the US and other US influenced markets. The connectors comprise a male plug and female socket and are designed such that the centre pin of the plug which carries the data signal is enclosed by the outer ground connection to ensure it is screened. Each phono connector typically only carries one audio channel—stereo applications use one connector for the left and one for the right channel.

Typical applications include, Hi-Fi interconnecting of apparatus; disco/professional equipment connections between audio and/or video equipment; speaker connections and the like.

It is typically found that apparatus which is manufactured for the market place in Europe, use scart connectors for interconnecting video and audio signal carrying apparatus. In markets such as the Americas and Australia, phono connectors are used.

Conventionally, in order to allow an item of apparatus to be converted from a say European SCART format connector to a US phone format connector use or vice versa, differently formatted printed circuit boards are required to be produced for insertion in the apparatus housing for the different marketplaces. This therefore means that for each product the manufacturer is typically required to have two different printed circuit board configurations to allow the reception of phono or scart connectors as required. This can be expensive, time consuming and may cause faults to be introduced which were not previously in the other printed circuit board design.

SUMMARY OF THE INVENTION

The aim of the present invention is to allow a common printed circuit board to be used for all apparatus, regardless of the market, and hence type of connector required to be used, thereby overcoming the need for a new circuit board to be created for each connector format.

In a first aspect of the invention there is provided electrical apparatus for the processing of video and/or audio data and which apparatus includes a printed circuit board carrying processing components thereon, the printed circuit board is provided with at least one scart connection for the connection of further apparatus thereto and for the transfer of data between said apparatus, and characterized in that there is provided for selective attachment to the scart connection, an adaptor, said adaptor provided with at least one scart connector for connection with the said apparatus, and at least one output connection for the selective connection thereto of phono and/or other format connectors for mutual engagement.

In accordance with the invention, a common printed circuit board or printed circuit boards in the apparatus housing can continue to be used for all markets, regardless of the connector type used. This reduces the development and production costs to the manufacturer. It also reduces the time to market for products that are required to be sold in various market places and this can be achieved by the selective use of the adaptor as herein described. The invention also increases the adaptability of the apparatus and hence reduces the frustration and irritation experienced by the apparatus owner conventionally, when they cannot connect their apparatus together due to different connector formats.

In one embodiment the apparatus is a broadcast data receiver and the printed circuit board of the same and the adaptor include two or more scart connectors for mutual engagement.

The printed circuit board and adaptor if used are typically provided as part of the apparatus within a housing which forms the external surface of the apparatus.

In one embodiment when the adaptor is not attached to the printed circuit board the at least one scart connector of the printed circuit board is exposed externally of the apparatus to allow the attachment of scart connectors for other apparatus thereto by the user.

In another embodiment when the adaptor is attached to the printed circuit board the at least one connector of the different format on the adaptor is exposed externally of the apparatus to allow the attachment of suitable format connectors thereto.

Typically, when attached to the printed circuit board, the adaptor is mounted in a plane perpendicular to the printed circuit board.

Typically the adaptor is positioned at the rear of the apparatus.

If required the adaptor can include connector outputs of more than one further format.

In a further aspect of the invention there is provided electrical apparatus for the processing of video and/or audio data and which apparatus includes a printed circuit board carrying processing components thereon and the printed circuit board is provided within a housing which has at least one connector of a first format connected to the printed circuit board and to allow the connection of further apparatus thereto and for the transfer of data between said apparatus, and characterized in that there is provided for selective attachment to the connector, an adaptor, said adaptor provided with at least one connector of the first format for connection with the said printed circuit board and at least one further connector of a second format which differs to the first format connector.

In one embodiment when the adaptor is not connected, the first format connector is exposed externally of the housing for connection with further apparatus.

In an alternative embodiment, when the adaptor is connected the connector with the second format is exposed externally of the housing for connection with further apparatus.

In a yet further aspect of the invention there is provided an adaptor for use with electrical apparatus which apparatus includes at least one connector of a first format connected to the printed circuit board and to allow the connection of further apparatus thereto and for the transfer of data between said apparatus, and characterized in that the adaptor is provided with at least one connector of the first format for connection with the said electrical apparatus and at least one further connector of a second format which differs to the first format connector.

It should be understood that reference to a connector refers to a two part, male and female, connector and that when referred to the adaptor will include one of the parts thereon, male or female, and the apparatus or printed circuit board to which the same is to be connected will include the other of the male or female parts of the connector.

DESCRIPTION OF THE DRAWINGS

A specific embodiment of the invention is described with reference to FIGS. 1 and 2, wherein.

DESCRIPTION OF THE PREFERRED EMBODIMENTS

Figure 1:
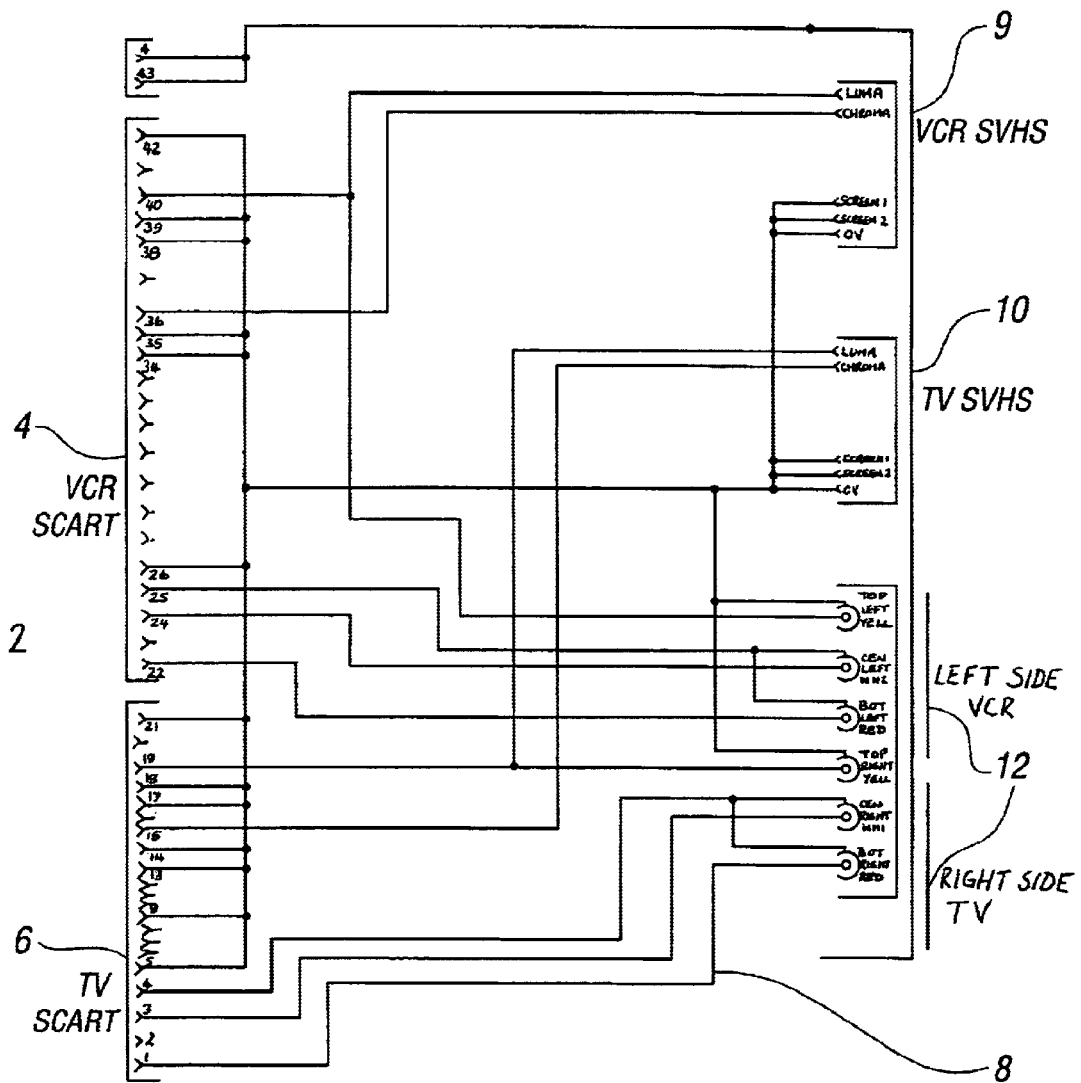
FIG. 1 illustrates a circuit diagram of an adaptor in accordance with one embodiment of the invention.

FIG. 1 illustrates an adaptor for use with apparatus, wherein said apparatus includes a printed circuit board 2 on which a range of components (not shown) are provided and two 21 pin scart connections 4, 6 one for the connection of a TV and one for a VCR to allow the flow of data between the same via cable connections. The printed circuit board can be provided in data processing apparatus such as, for example, in this embodiment, a broadcast data receiver which is provided to receive and process video and/or audio and/or auxiliary data and the printed circuit board is housed within an outer housing (not shown) which forms the external surface of the apparatus.

Figure 2:
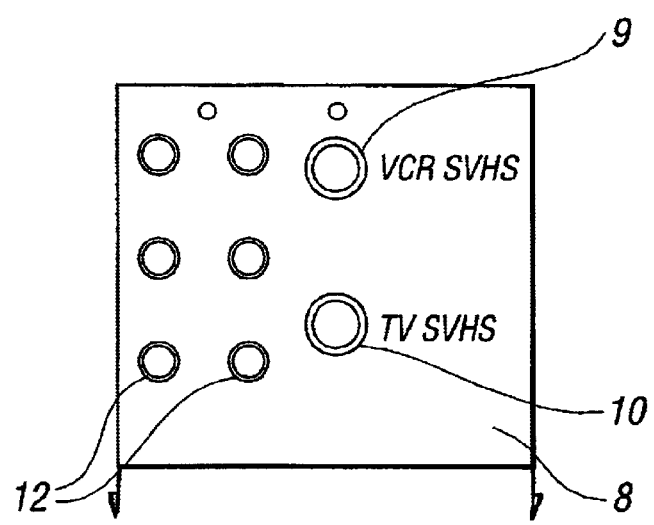
FIG. 2 illustrates an elevation of the adaptor in accordance with the invention.
Figure 3:
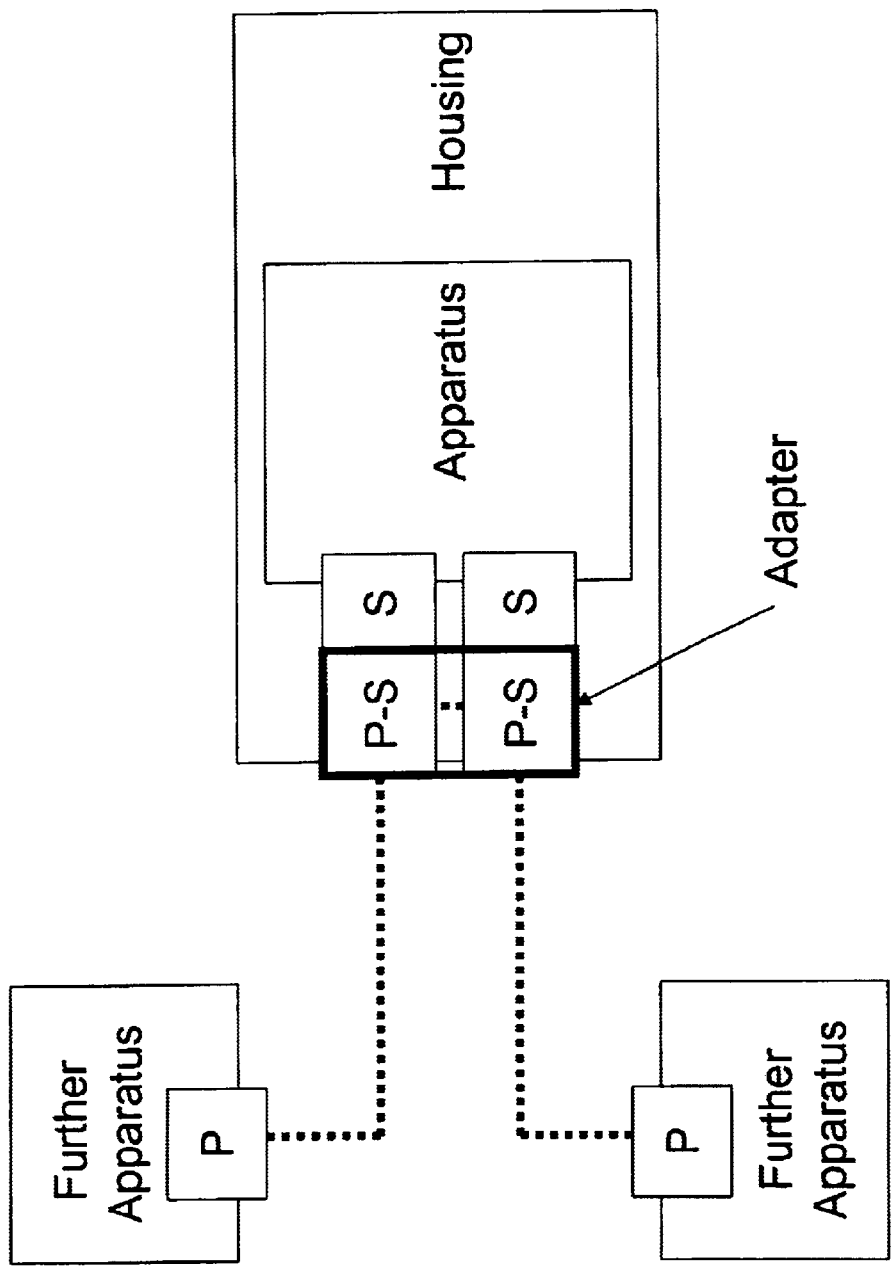
FIG. 3 illustrates in schematic view the adaptor of the present invention in use with an electrical apparatus and with further apparatuses.

In this embodiment the printed circuit board is shown in an adapted condition wherein there is shown connected to the scart connections 4,6 an adaptor 8, also shown in FIG. 2 in elevation. The adaptor is provided with a range of output connectors consisting of non scart format and in this embodiment comprises two Mini Din S-VHS format connectors 9, 10 and six phono format connectors indicated by the reference numeral 12. These output connectors are mounted at the external surface of the apparatus as shown in FIG. 2 so as to receive the Mini Din S-VHS or phono plug connectors of the said further apparatus. However if the adaptor was not fitted the scart connectors 2,4 would be moved to be exposed for external connection to the other apparatus.

The connectors 9,10,12 on the adaptor 8 are connected via the adaptor to the respective pins of the scart connectors 4,6 on the adaptor and hence allow connection with the scart connectors of the printed circuit board 2 and hence the apparatus.

The adaptor 8, which is typically connected into the scart connections 4 and 6 on the printed circuit board 2 and mounted with respect to the apparatus housing so that the connectors 9,10,12 are mounted at right angles thereto, can be used selectively by the apparatus manufacturer. Thus, if the apparatus which includes the printed circuit board 2 is to be used in a market or country where other associated apparatus is always provided with scart connectors, then the adaptor 8 in accordance with the invention need not be used.

However, if the apparatus is to be provided in a country where connectors other than scart connectors are provided for other forms of apparatus, then the adaptor 8 can be attached to the common printed circuit board. When connected into the scart connections 4 and 6 on the printed circuit board 2 of the apparatus at the time of manufacture the connector outputs 9, 10, 12 as illustrated in FIG. 2 are then exposed for the selective attachment of the connectors in the required format thereto, by the user when they purchase the apparatus.

This therefore means that the assembly of the apparatus at the time of manufacture is simplified, adaptable and so a uniform printed circuit board in the apparatus can be utilised. It also means that when the apparatus is purchased for use in a particular country the correct format connector sockets, either scart connections, or phono or other format connections are presented and exposed, typically at the rear of the apparatus, to allow the connection of the apparatus thereto. The user does not have to choose or have knowledge of connector types as the correct format connector sockets only are presented for use, the decision as whether to use the adaptor 8 or not already having been made by the manufacturer with knowledge of the ultimate destination and connector format used for the apparatus.

While reference is made to the adaptor having scart connectors for attachment to the printed circuit board and other format connectors for connection to further apparatus it should be appreciated that the adaptor could alternatively have a first connector type, not necessarily scart, for attachment to the printed circuit board and a further connector format, perhaps including a scart connector output for connection with further apparatus to suit specific market requirements.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An electrical apparatus for the processing of video and/or audio data, said apparatus comprising:

an apparatus housing;

a printed circuit board within said apparatus housing and carrying processing components thereon and the printed circuit board is provided with at least one scart connector for the connection of further apparatus externally thereto and for the transfer of data between said further apparatus and/or said apparatus, an adaptor provided with at least one scart connector for connection with said apparatus, and having at least one output connector for selectively connecting to phono and/or other format connectors, of said further apparatus, and when said adaptor is attached to said printed circuit board of said apparatus, the adaptor is located within said housing of said apparatus with the at least one output connector exposed externally of said housing of said apparatus to allow attachment of said phono and/or other format connectors of said further apparatus thereto.

2. Apparatus according to claim 1 wherein the configuration of said printed circuit board is independent of the connector configuration.

3. Apparatus according to claim 1 wherein said apparatus is a broadcast data receiver.

4. Apparatus according to claim 1 wherein said printed circuit board and said adaptor include two or more scart connectors for mutual engagement.

5. Apparatus according to claim 1 wherein when said adaptor is not attached to said printed circuit board the at least one scart connector of said printed circuit board is exposed externally of said apparatus to allow the attachment of scart connectors thereto by a user.

6. Apparatus according to claim 1 wherein when attached to said printed circuit board, said adaptor connectors are mounted in a plane perpendicular to said printed circuit board.

7. Apparatus according to claim 1 wherein said adaptor is positioned at a rear of said apparatus.

8. Apparatus according to claim 1 wherein said connector includes connector outputs of more than one format.

9. An electrical apparatus for the processing of video and/or audio data, said apparatus comprising:

a printed circuit board carrying processing components thereon, the printed circuit board being located within a housing and has at least one connector of a first format connected to the printed circuit board to allow the connection of further apparatus thereto for the transfer of data between said further apparatus and/or said apparatus, and wherein there is provided for selective attachment to said at least one connector of the first format of said printed board of said apparatus, an adaptor provided with at least one connector of said first format for connection with said at least one connector of the first format of said printed circuit board of said apparatus and at least one further connector of a second format which differs from said first format connector and said adaptor located within the housing with said at least one further connector of a second format exposed externally of the housing.

10. Electrical apparatus according to claim 9 wherein when said adaptor is not connected, the first format connector is exposed externally of said housing for connection with further apparatus.

* * * * *